Dec. 29, 1925.
L. V. HOSFORD ET AL
1,567,949
INTERNAL COMBUSTION ENGINE
Filed Dec. 22, 1924
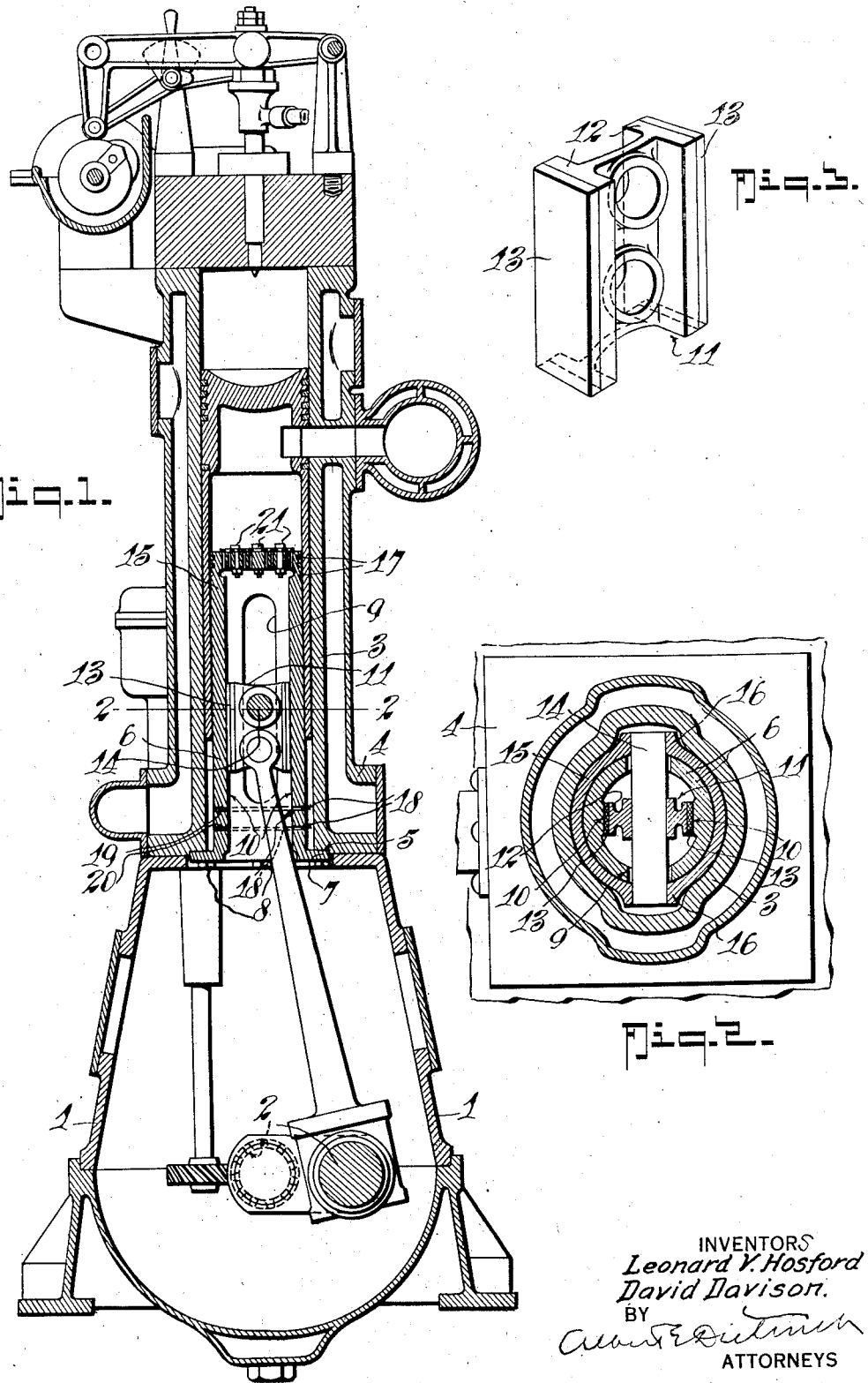
INVENTORS
Leonard V. Hosford
David Davison.
BY
ATTORNEYS Patented Dec. 29, 1925.

1,567,949

UNITED STATES PATENT OFFICE.

LEONARD V. HOSFORD AND DAVID DAVISON, OF PORTLAND, OREGON, ASSIGNORS, BY MESNE ASSIGNMENTS, TO HOSFORD MOTOR CONSTRUCTION CO., A CORPORATION OF OREGON.

INTERNAL-COMBUSTION ENGINE.

Application filed December 22, 1924. Serial No. 757,444.

*To all whom it may concern:*

Be it known that we, LEONARD V. HOSFORD and DAVID DAVISON, a citizen of the United States and a subject of Great Britain, respectively (petitioner Davison has applied for citizenship in the United States), both residing at Portland, in the county of Multnomah and State of Oregon, have invented a new and Improved Internal-Combustion Engine, of which the following is a specification.

Our present invention has for its object to provide an improved construction of stationary piston and piston rod connections with a moving piston of the sleeve type, such as disclosed in our application filed August 23, 1924, Serial No. 733,814.

More specifically the invention has for its object to provide a design which will enable the use of a cross head with the stationary piston to overcome the side thrusts of the reciprocating piston of large sized engines of this type.

In general the present invention resides in providing an inner or stationary piston with means for securing it rigidly to the cylinder base, whereby its axis will always align with that of the cylinder, a space being left between the outer wall of the fixed piston and the inner wall of the cylinder, in which space the reciprocating piston works, the stationary piston having inward projections extending from top to bottom in diametrically opposite locations with machined faces to constitute cross head ways. A cross head is located in the stationary piston and operates between and in contact with the ways, it being connected by a connecting rod with the crank shaft; the stationary piston has vertical slots diametrically opposite one another and at locations at right angles to the ways, through which slots the pin that connects the cross head with the reciprocating piston projects.

More subordinately the invention also resides in those novel features of construction, combination and arrangement of parts, all of which will be first fully described, then be specifically pointed out in the appended claims, reference being had to the accompanying drawings, in which:—

Figure 1 is a vertical transverse section of a portion of the engine embodying my invention.

Figure 2 is a horizontal cross section on the line 2—2 of Figure 1.

Figure 3 is a perspective view of the cross head.

In the drawing, in which like numerals of reference indicate like parts in all the figures, 1 represents the crank case, 2 the crank shaft, 3 the outer cylinder and 4 the base of the cylinder which is provided with a recess 5 to receive the base flange 7 of the stationary piston 6 to which it is secured by bolts 8, or in any other suitable way.

The stationary piston has slots 9 at diametrically opposite places and it is also provided with inward projections or ribs 10 extending from top to bottom in diametrically opposite locations and at places at right angles to the slots 9. The opposing faces of the projections 10 are machined or made smooth to act as cross head ways.

11 designates the cross head which has slippers 12, the faces of which are babbitted as at 13 to reduce friction. 14 is the cross head pin which connects the cross head 11 to the reciprocating piston 15, the ends of the pin 14 lying in the bosses 16 of that piston.

The stationary piston adjacent to its top is provided with oil grooves and packing rings 17 to make a gas tight joint, and near its bottom it is provided with oil grooves 18 from which lead-back holes 19 convey the excess back to the crank case. Other leadback oil holes 20 are provided near the bottom of the stationary piston just above its flange for the same purpose.

21 designates the air valves in the head of the stationary piston. There may be one or more of these valves which are preferably of the disk grate type.

The means for leading fuel charges into the combustion chamber of the engine, igniting the same, etc. etc., may all be of the ordinary construction. hence a description thereof in this case is thought to be unnecessary.

It will be seen from the foregoing description, taken in connection with the accompanying drawing, that with the present arrangement the angular thrusts to the connecting rod are taken up by the cross head and stationary piston in a plane which includes the cross head ways and slippers. This prevents the transmission of lateral thrusts to the reciprocating piston and eliminates the wear incident thereto. By mounting the cross head in the stationary piston, the stationary piston, cross head and reciprocating piston may be assembled as a unit and proper alignment of the two pistons may be at all times maintained.

In the practical operation of an engine constructed with our present improvement the oil mist from the crank case is carried up into the stationary piston and passes through the vertical slots therein to lubricate the adjacent surfaces of the reciprocating piston, excess oil gravitating downwardly into the pocket formed between the stationary piston and the cylinder and returning to the crank case through the lowermost lead-back holes 20, thus insuring effective lubrication of the reciprocating piston.

From the foregoing description, taken in connection with the accompanying drawing, it is thought that the construction, operation and advantages of the invention will be clear to those skilled in the art.

What we claim is:

1. An internal combustion engine wherein is provided a crank case, a crank shaft, a cylinder secured to the crank case; a stationary piston secured at its lower end in the cylinder base, a reciprocating piston fitted over the stationary piston and within the cylinder, said stationary piston having a pair of diametrically opposite slots and a pair of diametrically opposite inward projections constituting vertical slideways, the slideways being positioned at approximately right angles to the slots, a cross head having slippers mounted in said stationary piston in cooperation with said slideways, a connecting rod and wrist pin joining the cross head with the crank shaft, a pin carried by the cross head and projecting through said slots with its ends mounted in bosses on the reciprocating piston.

2. An internal combustion engine wherein is provided a crank case, a crank shaft, a cylinder secured to the crank case; a stationary piston secured at its lower end to the cylinder base, a reciprocating piston fitted over the stationary piston and within the cylinder, said stationary piston having a pair of diametrically opposite slots and a pair of diametrically opposite inward projections constituting vertical slideways, the slideways being positioned at approximately right angles to the slots, a cross head having slippers mounted in said stationary piston in cooperation with said slideways, a connecting rod and wrist pin joining the cross head with the crank shaft, a pin carried by the cross head and projecting through said slots with its ends mounted in bosses on the reciprocating piston, said slippers having faces of friction reducing bearing metal.

3. An internal combustion engine wherein is provided a crank case, a crank shaft, a cylinder secured to the crank case; a stationary piston secured at its lower end in the cylinder base, a reciprocating piston fitted over the stationary piston and within the cylinder, said stationary piston having a pair of diametrically opposite slots and a pair of diametrically opposite inward projections constituting vertical slideways, the slideways being positioned at approximately right angles to the slots, a cross head having slippers mounted in said stationary piston in cooperation with said slideways, a connecting rod and wrist pin joining the cross head with the crank shaft, a pin carried by the cross head and projecting through said slots with its ends mounted in bosses on the reciprocating piston, said stationary piston having packing rings and grooves adjacent its head and having oil lead-back grooves and holes near its lower extremity.

LEONARD V. HOSFORD.
DAVID DAVISON.